(12) United States Patent
Yago et al.

(10) Patent No.: US 6,814,842 B1
(45) Date of Patent: *Nov. 9, 2004

(54) SYSTEM AND METHOD FOR ORGANIZING OBJECTS OF A VOICE CALL IN A TREE REPRESENTATION

(75) Inventors: Paul C. Yago, Santa Cruz, CA (US);
Miles Wu, Fremont, CA (US);
Kaiwang Zhang, Milpitas, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 10/017,856

(22) Filed: Dec. 14, 2001

(51) Int. Cl.⁷ .............................................. G10L 21/00
(52) U.S. Cl. ..................... 204/270.1; 704/270; 704/275
(58) Field of Search ............................ 704/270, 270.1, 704/275; 709/224

(56) References Cited

U.S. PATENT DOCUMENTS

| | | | |
|---|---|---|---|
| 5,323,452 A | 6/1994 | Dickman et al. | 379/201 |
| 5,519,830 A | 5/1996 | Opoczynski | 395/182.02 |
| 5,999,525 A | 12/1999 | Krishnaswamy et al. | 370/352 |
| 6,138,127 A | 10/2000 | Pasch | 707/206 |
| 6,192,255 B1 | 2/2001 | Lewis et al. | 455/558 |
| 6,195,116 B1 | 2/2001 | Lee | 348/15 |
| 6,266,700 B1 | 7/2001 | Baker et al. | 709/230 |
| 6,311,278 B1 | 10/2001 | Raanan et al. | 713/201 |
| 6,604,139 B1 * | 8/2003 | Sajina et al. | 709/224 |
| 2001/0033650 A1 | 10/2001 | Wilson et al. | 379/398 |

FOREIGN PATENT DOCUMENTS

| | | | |
|---|---|---|---|
| EP | 0948164 A1 | 10/1999 | H04L/12/26 |
| WO | 98/03023 | 1/1998 | H04Q/3/00 |
| WO | 98/36559 | 8/1998 | H04N/5/262 |
| WO | 99/19803 | 4/1999 | G06F/13/00 |

* cited by examiner

*Primary Examiner*—Susan McFadden
(74) *Attorney, Agent, or Firm*—Silicon Valley IP Group, PC; Kevin J. Zilka; Christopher J. Hamaty

(57) ABSTRACT

A system, method and computer program product are provided for organizing objects associated with a voice application call in a tree representation. Initially, a voice application call is identified. Next, a plurality of connection objects is generated associated with the voice application call. Further, a plurality of session objects associated with the voice application call is identified, along with a plurality of application objects associated with the voice application call. In use, the connection objects, the session objects, and the application objects are organized in a tree representation.

29 Claims, 8 Drawing Sheets

SYSTEM AND METHOD FOR ORGANIZING OBJECTS OF A VOICE CALL IN A TREE REPRESENTATION

FIELD OF THE INVENTION

The present invention relates to network analysis, and more particularly to analyzing Voice over Internet Protocol (VoIP) calls.

BACKGROUND OF THE INVENTION

Voice signals are transmitted over a packet network by first formatting the voice signal data stream into multiple discrete packets. In a Voice Over Internet Protocol (VoIP) call, an originating voice gateway quantizes an input audio stream into packets that are placed onto a packet network and routed to a destination voice gateway. The destination voice gateway decodes the packets back into a continuous digital audio stream that resembles the input audio stream. As an option, a compression or decompression algorithm may be used on the quantized digital audio stream to reduce the communication bandwidth required for transmitting the audio packets over the network.

Similar to conventional Internet Protocol, VoIP includes a plurality of layers. Prior Art FIG. 1 illustrates a plurality of exemplary well known layers 10 associated with VoIP. As shown, such layers include at least one application layer 12 and a plurality of session layers 14 positioned below the application layer 12. While not shown, at least one connection layer may be positioned below the session layer. By way of example, the application layer 12 may include H.323. H.323 is a standard approved by the International Telecommunication Union (ITU) in 1996 to promote compatibility in videoconference transmissions over IP networks. Further included as session layers are H.225.0, H.245, real-time transport protocol (RTP), and real-time transport control protocol (RTCP). It should be noted that VoIP calls can employ various protocols for communication purposes.

The Quality of Service (QoS) of VoIP calls can degrade due to congestion on the packet network or failure of network processing nodes in the packet network. Quality of service can include anything from call sound quality to the ability and responsiveness of the VoIP network in establishing new VoIP calls. IP network reliability has not been proven to be in the same class as a traditional switched Public Services Telephone Network (PSTN).

Due to a need to understand, troubleshoot and optimize a particular network to improve VoIP calls, there is an on-going desire for traditional network assessment tools to be tailored to monitor network parameters specific to VoIP calls. Network assessment tools referred to as "analyzers" are often relied upon to analyze networks communications at a plurality of layers. One example of such analyzers is the SNIFFER ANALYZER™ device manufactured by NETWORK ASSOCIATES, INC™. Analyzers have similar objectives such as determining why network performance is slow, understanding the specifics about excessive traffic, and/or gaining visibility into various parts of the network.

As mentioned earlier, network analyzers collect information at a plurality of layers. Each set of layer-specific data is conventionally stored in a buffer "object" by the network analyzer. In particular, a session object, an application object, etc. are each used to store network traffic information at session and application layers, respectively. With the number of such objects growing proportionally with the overall network usage, there is a growing need to organize the objects for monitoring, reporting and analysis purposes.

Non-voice-protocol-enabled network analyzers have often initialized a hierarchical tree representation for organizing objects for improved monitoring, reporting and analysis. In other words, session objects are organized under a single application object, and so on. Unfortunately, no effort has made thus far to apply such tree representation to the voice protocol domain.

There is thus a need for a tree representation tailored for voice protocols for improving VoIP call monitoring, reporting and analysis.

Further, each network layer in traditional network analyzers has an object threshold (i.e. default 1000). When this threshold is reached, no more objects can be created for that layer. Therefore, one of the existing objects must be recycled. In order to choose an appropriate object to be recycled, traditional network analyzers choose an object that was not created less than x seconds ago (where x is statistically defined). In other words, as long as an object isn't relatively new, it is a candidate for recycling.

Traditionally when an object is recycled, traditional network analyzers walk up the tree representation and recycle all the higher layer objects until a top layer is reached. This way, there are no orphaned objects at the top of the tree (i.e. an application layer without an associated session layer, etc.). Unfortunately, this conventional technique results in the loss of all session objects along with the associated application object when one session object is recycled. This loss of network data can be undesirable when such other recycled objects may contain information still of interest, especially in the context of VoIP calls where such recycled objects may relate to an active call still of interest.

There is thus a need for an object recycling technique that does not recycle objects that may still be of interest during analysis during a voice application call.

DISCLOSURE OF THE INVENTION

A system, method and computer program product are provided for organizing objects associated with a voice application call in a tree representation. Initially, a voice application call is identified. Next, a plurality of connection objects is generated associated with the voice application call. Further, a plurality of session objects associated with the voice application call is identified, along with a plurality of application objects associated with the voice application call. In use, the connection objects, the session objects, and the application objects are organized in a tree representation.

In one embodiment, the voice application call may be carried out utilizing a voice protocol. Such voice protocol may include Voice over Internet Protocol (VoIP).

In another embodiment, the application objects may include, but are not limited to H.323 application objects, H.248 application objects, session initiation protocol (SIP) application objects, and/or skinny client control protocol (SCCP) application objects.

In still another embodiment, the session objects may include, but are not limited to H.225.0 session objects, H.245 session objects, real-time transport protocol (RTP) session objects, and/or real-time transport control protocol (RTCP) session objects.

In still yet another embodiment, the connection objects may include, but are not limited to transmission control protocol (TCP) connection objects, and/or user datagram protocol (UDP) connection objects.

As an option, the tree representation may be displayed as a file directory including a plurality of directories and files.

In use, the objects may be accessed by selecting the directories and files. Further, information relating to the objects may be reported upon the selection thereof.

As such, a plurality of nodes is provided each representing a flow associated with a particular protocol, wherein flow statistics are updated in real-time.

Another system, method and computer program product are provided for recycling voice application objects. In use, it is determined whether a voice application call is active. Next, application objects and session objects associated with the voice application call are marked as active until it being determined that the voice application call is inactive. As such, the recycling of application objects and session objects marked as active are prevented.

BRIEF DESCRIPTION OF THE DRAWINGS

Prior art

DESCRIPTION OF THE PREFERRED EMBODIMENTS

Figure 1:
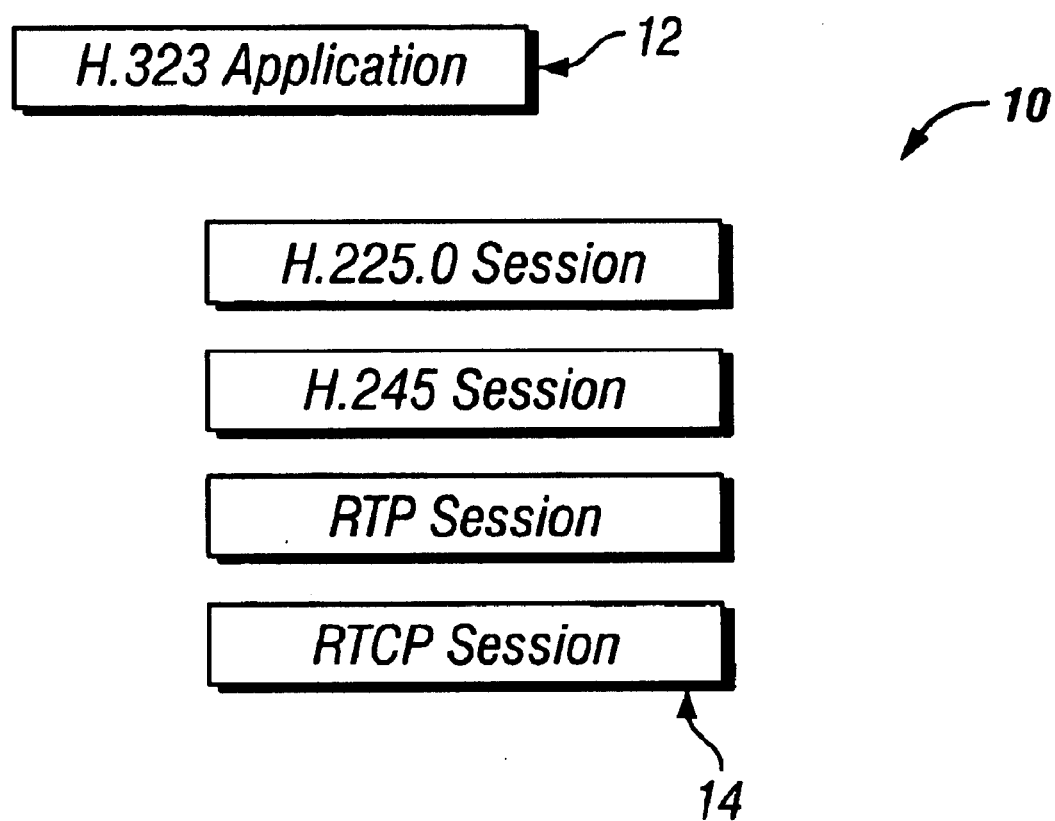
FIG. 1 illustrates exemplary protocol layers associated with Voice over Internet Protocol (VoIP) calls.
Figure 1A:
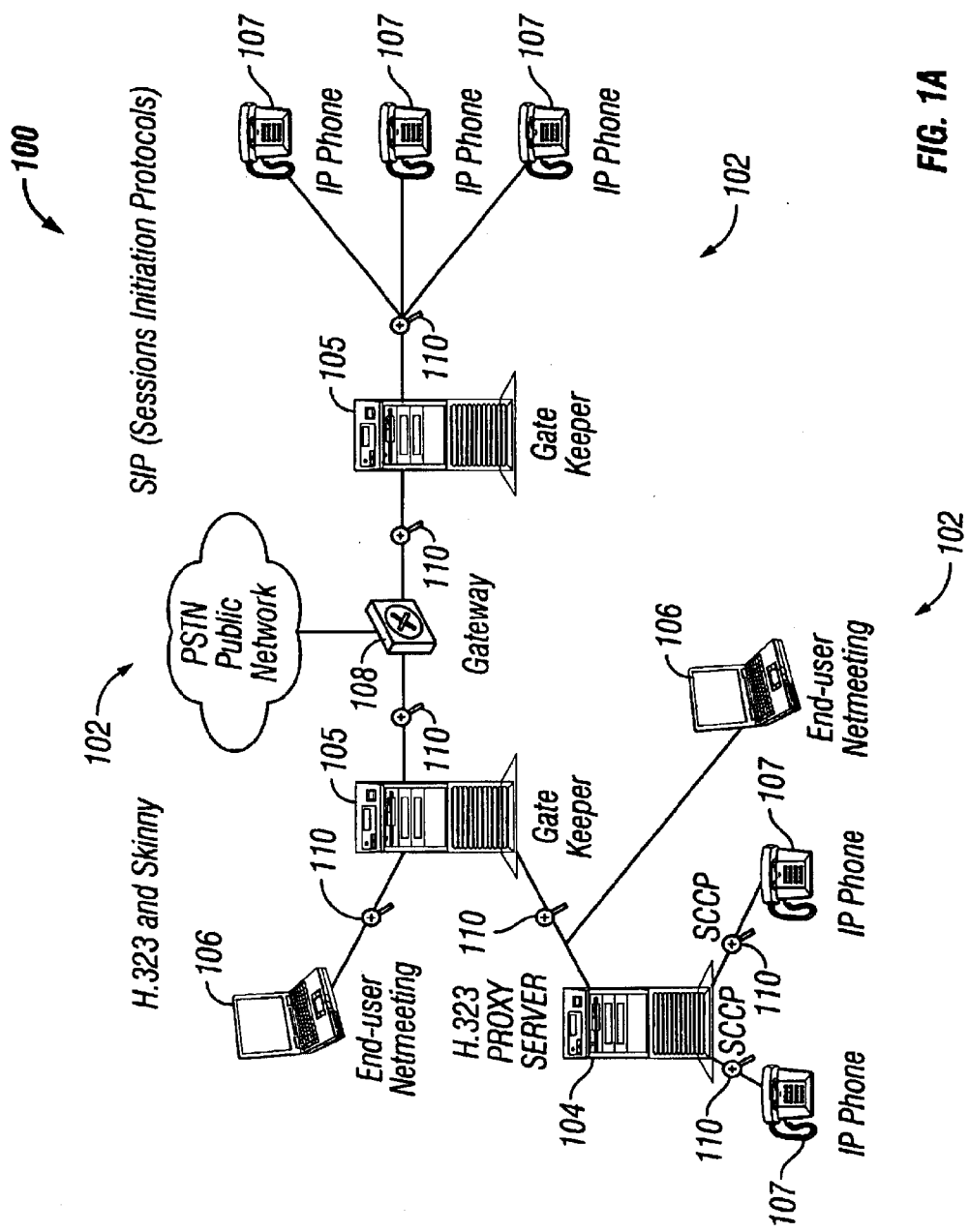
FIG. 1A illustrates an exemplary network architecture, in accordance with one embodiment.

FIG. 1A illustrates a network architecture 100, in accordance with one embodiment. As shown, a plurality of networks 102 is provided. In the context of the present network architecture 100, the networks 102 may each take any form including, but not limited to a local area network (LAN), a public switched telephone network (PSTN), a wide area network (WAN) such as the Internet, etc.

Coupled to the networks 102 are servers 104 and gatekeepers 105 which are capable of communicating over the networks 102. Also coupled to the networks 102 and the servers 104 is a plurality of end user devices 106. In the context of the present description, such end user devices 106 may include a web server, desktop computer, lap-top computer, hand-held computer, or any other type of hardware/software.

Also included is a plurality of Internet Protocol (IP) telephones 107 coupled to the various servers 104 and end user devices 106. In use, the IP telephones 107 are adapted for communicating via the networks 102 utilizing IP. It should be noted that the IP telephones 107 may be operated in accordance with any desired protocol including, but not limited to H.323, H.248, session initiation protocol (SIP), skinny client control protocol (SCCP), or any other desired protocol capable of handling VoIP.

In order to facilitate communication among the networks 102, at least one gateway 108 is coupled therebetween. It should be noted that each of the foregoing network devices as well as any other unillustrated devices may be interconnected by way of a plurality of network segments. In the context of the present description, a network segment includes any portion of any particular network capable of connecting different portions and/or components of a network.

Resident on any of the foregoing components and/or network segments may be a network assessment tool such as a network analyzer 110. Each network analyzer 110 may be relied upon to analyze networks communications at a plurality of layers. One example of such analyzer 110 is the SNIFFER ANALYZER™ device manufactured by NETWORK ASSOCIATES, INC™. In use, the analyzer 110 may collect information for the purpose of determining why network performance is slow, understanding the specifics about excessive traffic, and/or gaining visibility into various parts of the network.

In use, the network analyzers 110 are capable of organizing objects associated with a voice application call in a tree representation. Initially, a voice application call is identified. Next, a plurality of connection objects is generated associated with the voice application call. Further, a plurality of session objects associated with the voice application call is identified, along with a plurality of application objects associated with the voice application call. In use, the connection objects, the session objects, and the application objects are organized in a tree representation.

By this design, the various data associated with each of the voice connection objects, the session objects, and the application objects may be more easily monitored and analyzed. With the number of such objects growing proportionally with the overall voice traffic, such organization is critical for efficient and effective monitoring, reporting, and analysis. More information regarding an exemplary application of such technique will be set forth hereinafter in greater detail.

Figure 2:
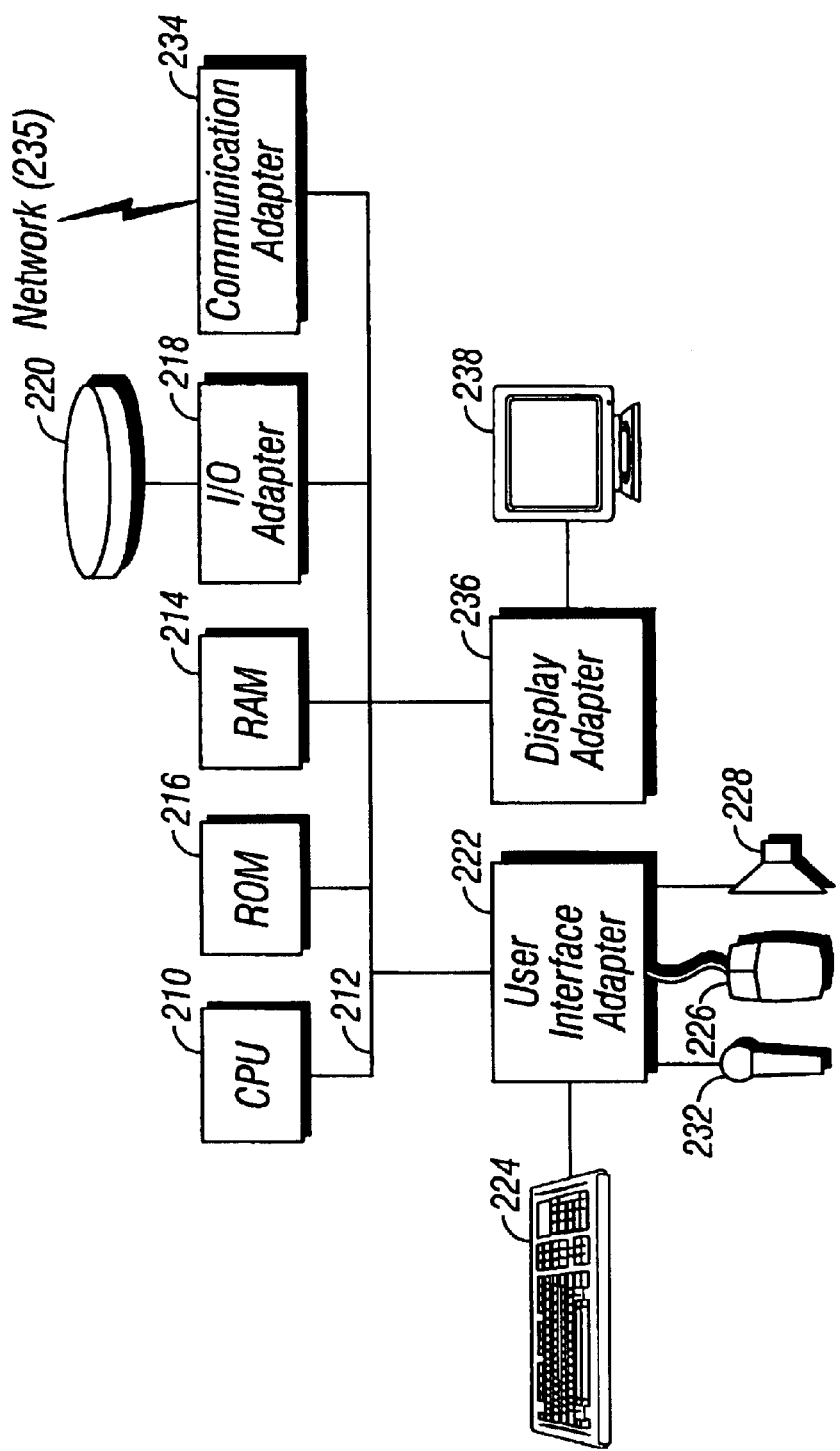
FIG. 2 shows a representative hardware environment that may be associated with the various devices of FIG. 1A, in accordance with one embodiment.

FIG. 2 shows a representative hardware environment that may be associated with the various devices of FIG. 1A, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology.

Object oriented programming (OOP) has become increasingly used to develop complex applications.

Figure 3:
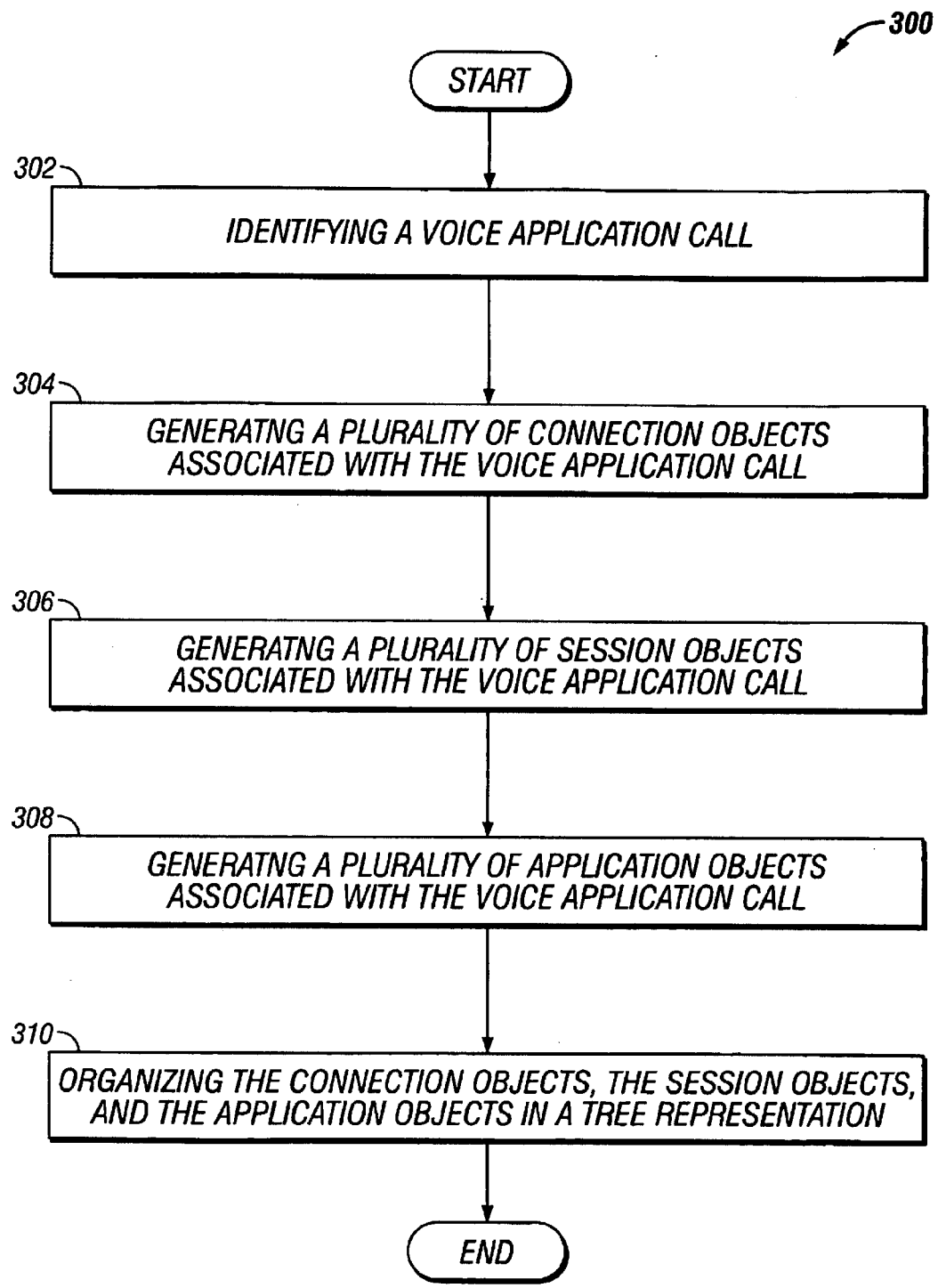
FIG. 3 illustrates a method for organizing objects associated with a voice application call in a tree representation, in accordance with one embodiment.

FIG. 3 illustrates a method 300 for organizing objects associated with a voice application call in a tree representation, in accordance with one embodiment. As an option, the present method 300 may be used in the context of a network analyzer like that mentioned during reference to FIG. 1. Of course, the present techniques may be utilized in any desired context.

Initially, in operation 302, a voice application call is identified. In the context of the present description, a voice application call may include any type of communication of voice signals over a packet-switched network. Just by way of example, the voice application call may include communication utilizing IP telephones similar to those of FIG. 1 with a desired protocol including, but not limited to H.323, H.248, SIP, SCCP, or any other desired protocol capable of handling VoIP.

The voice application call may be identified by identifying a message that is often used to initiate a voice application call. In one embodiment, such message may include a station call information message. Moreover, the message may include a plurality of fields. Optionally, the message may include a calling party name field, a calling party port number field, a called party name field, and a called party port number field. As yet another option, the voice application calls may be uniquely identified using these and various other fields such as port numbers and the like.

Next, a plurality of objects is generated associated with the voice application call. See operations 304–308. Such objects may be updated in real-time automatically, or in a manner dictated by a user. In the context of the present description, an object may refer to a buffer, memory, table or any other set of data that is associated with a specific communication protocol layer (i.e. connection, session, application, etc.). Of course, various other layers may be represented by other objects.

In use, information is collected at a plurality of layers. Each set of layer-specific data is stored in a dedicated object by the network analyzer. In particular, a connection object, a session object, and an application object are each used to store network traffic information at connection, session, and application layers, respectively.

In operation 310, the connection objects, the session objects, and the application objects are organized in a tree representation. In the context of the present description, a tree representation may include any hierarchical organization of the connection objects, the session objects, and the application objects which facilitates the collection, accessing, monitoring, and/or analysis of the data associated with a voice application call. An exemplary tree representation will be set forth in greater detail during reference to FIG. 4.

As an option, the tree representation may be displayed as a file directory including a plurality of directories and files. In use, the objects may be accessed by selecting the directories and files. Further, information relating to the objects may be reported upon the selection thereof. More information on such specific use of the tree representation will be set forth during reference to FIGS. 5 and 6.

Figure 4:
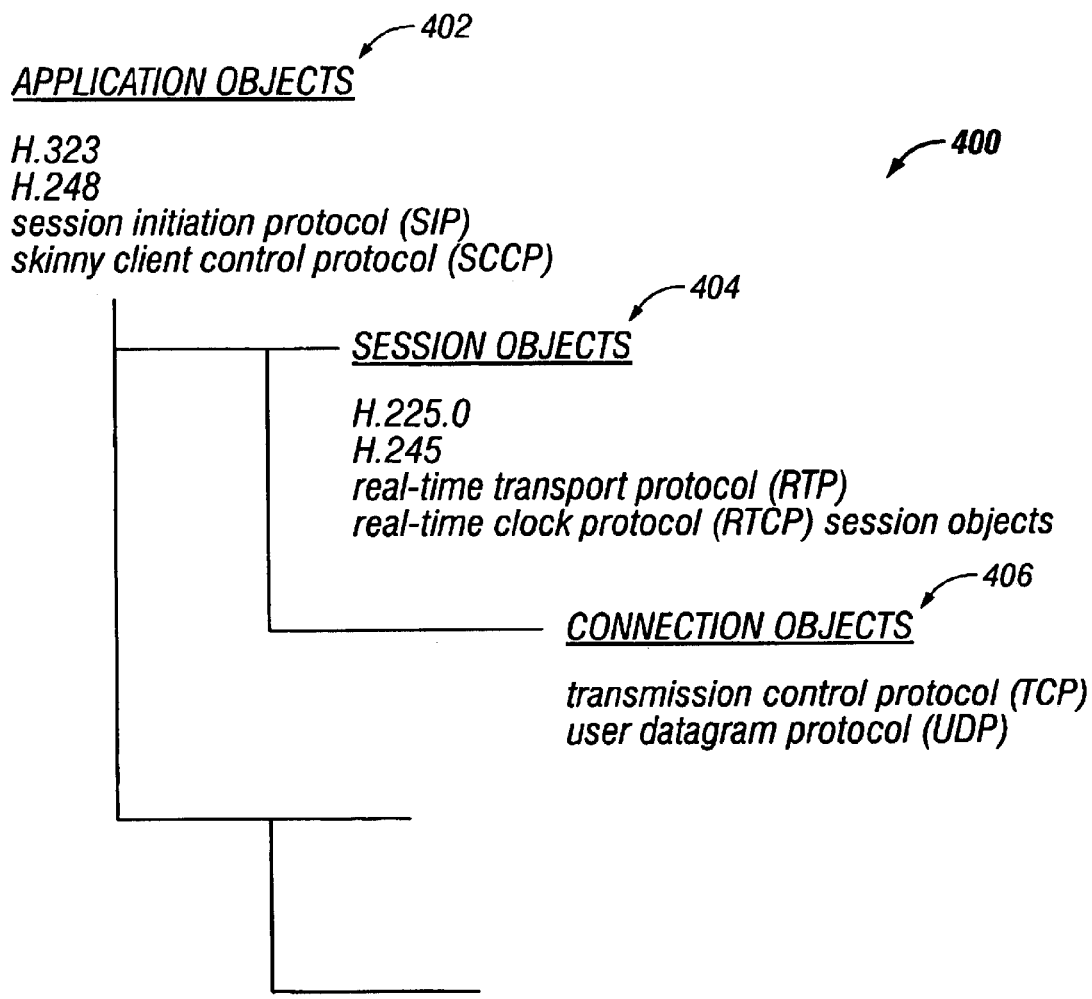
FIG. 4 illustrates an exemplary tree representation of the network analyzer objects along with sample protocol data that may be collected for each object.

FIG. 4 illustrates an exemplary tree representation 400 of the network analyzer objects along with sample protocol data that may be collected for each object. As shown, the tree representation 400 includes at least one application object 402 each with one or more session objects 404 associated therewith. Further, each session object 404 has one or more connection objects 406 associated therewith. This association may be accomplished in any desired manner. Just by way of example, pointers, links, etc. may be used to associate a layer of objects with another layer of associated objects therebeneath.

As shown in FIG. 4, the application objects 402 may include, but are not limited to H.323 application objects, H.248 application objects, SIP application objects, and/or SCCP application objects. Of course, any other application protocols may be the subject of the application objects 402.

Moreover, the session objects 404 may include, but are not limited to H.225.0 session objects, H.245 session objects, real-time transport protocol (RTP) session objects, and/or real-time transport control protocol (RTCP) session objects. Of course, any other session protocols may be the subject of the session objects 404.

Still yet, the connection objects 406 may include, but are not limited to transmission control protocol (TCP) connection objects, and/or user datagram protocol (UDP) connection objects. Of course, any other connection protocols may be the subject of the connection objects 406.

Figure 5:
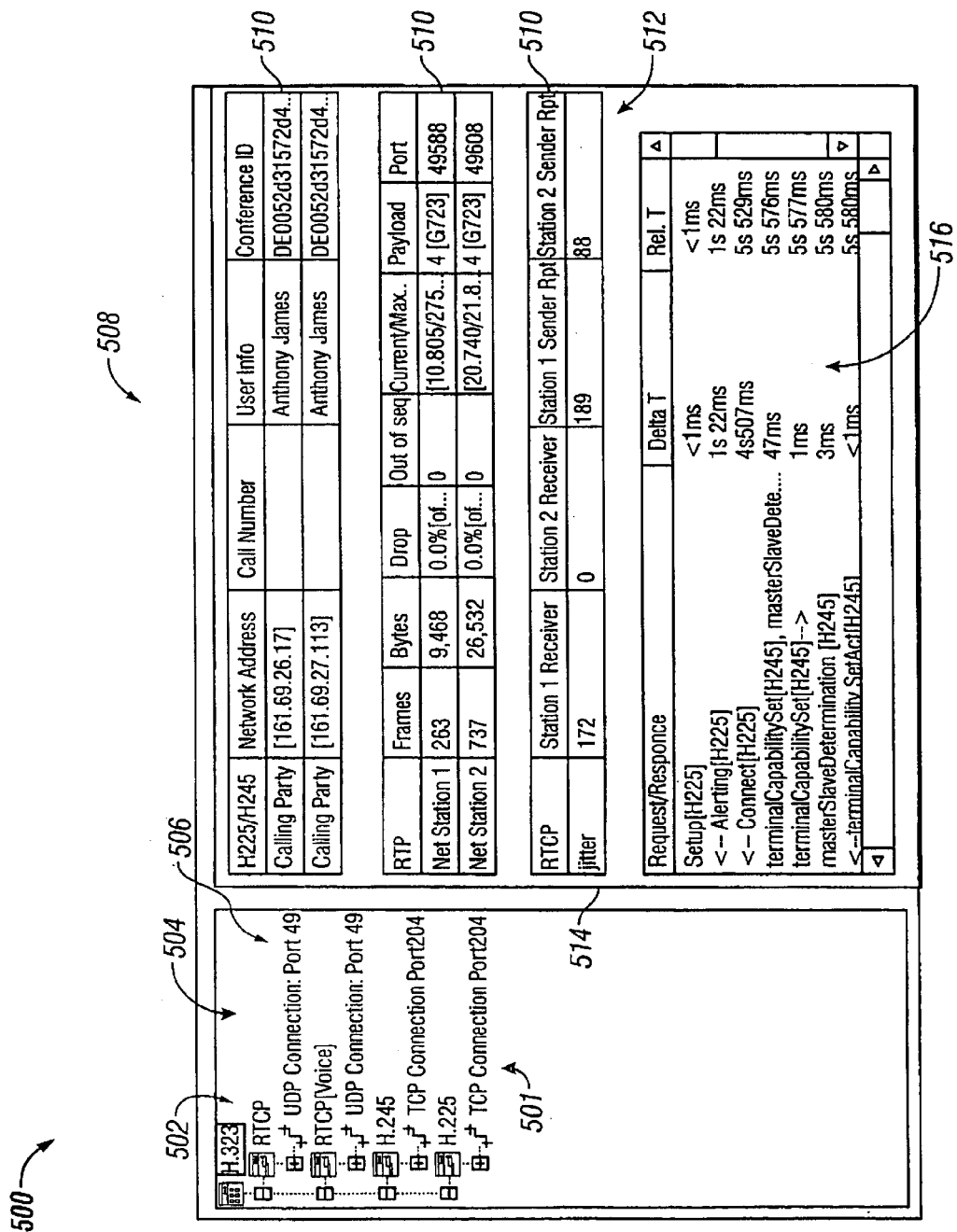
FIG. 5 specifically shows a tabular display resulting from the selection of an application object in the representation.
Figure 6:
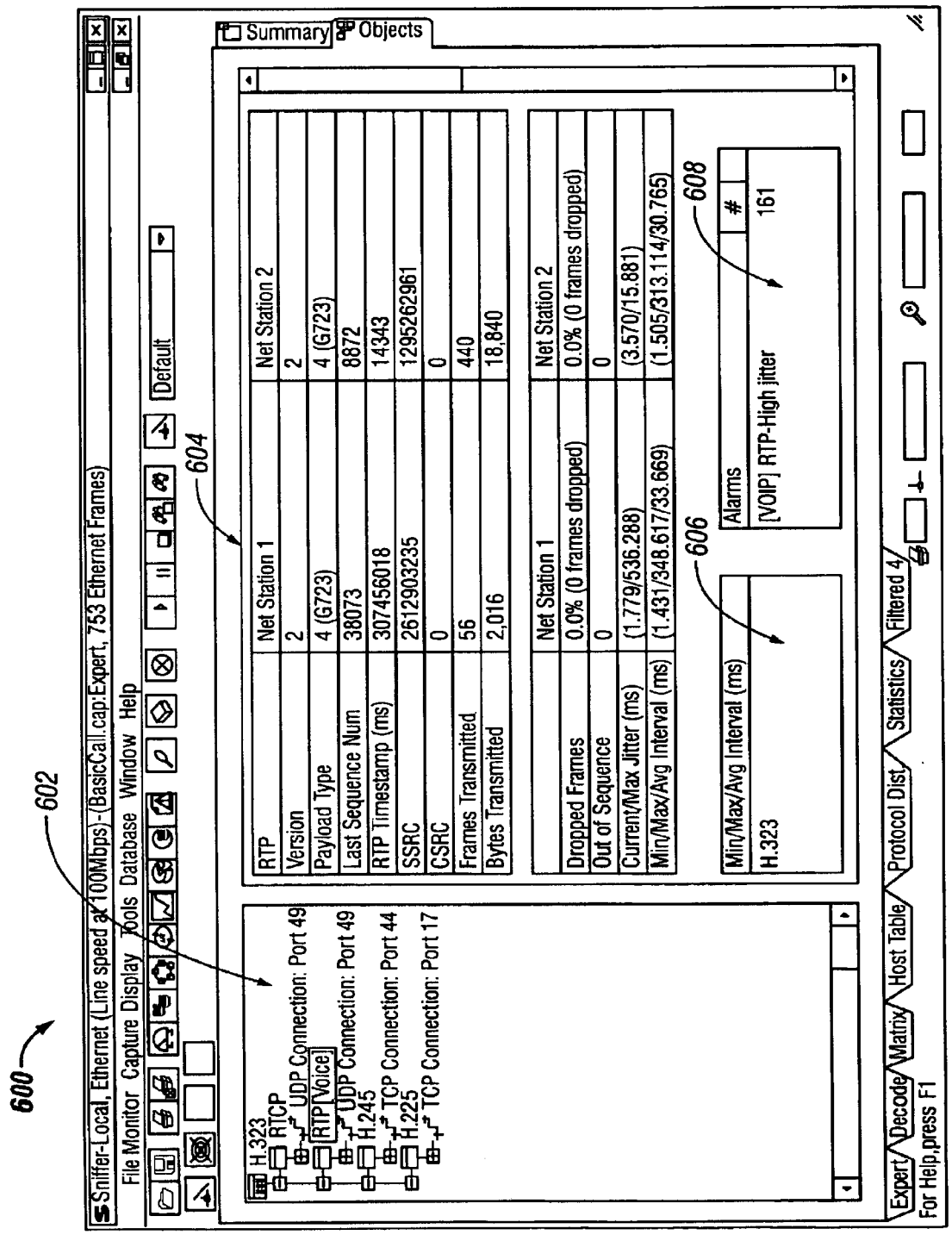
FIG. 6 illustrates a graphical user interface similar to that of FIG. 5, with the exception of displaying lower protocol layer objects.

FIGS. 5 and 6 illustrate graphical user interfaces 500 and 600 showing an exemplary use of the tree representation to facilitate the monitoring and analysis of a voice application call, in accordance with one embodiment. Of course, the tree representation set forth hereinabove may be used in any desired manner, per the desires of the user.

As shown in FIG. 5, a tree representation 501 may be displayed as any desired combination of file directories 502 including a plurality of subdirectories 504 which, in turn, include a plurality of files 506. Each one of such entities (i.e. directories, subdirectories, files, etc.) is indicative of an associated object. By selecting one of such entities, collected data associated with a specific protocol layer(s) is displayed in a tabular display 508. FIG. 5 specifically shows a tabular display 508 resulting from the selection of an application object in the tree representation 501.

Such tabular display 508 includes a plurality of display portions 510 each dedicated to displaying information associated with lower-layer objects associated with the object selected via the tree representation 501. In the present example, an application object is selected, thus a plurality of session objects are displayed. In particular, each session object displayed in the display portions 510 includes a matrix having a plurality of x-axis parameters 512 and y-axis parameters 514 unique to the specific protocol corresponding to the object.

For example, an H225/H245 object may include calling party, called party, network address, call number, user information, conference identifier, etc. for describing communications at that particular session layer of a voice application call. Still yet, an RTP object may include a first network station, a second network station, frames, bytes, dropped percentage, out of sequence numbers, current/maximum parameters, payload size, port number, etc. In another example, an RTCP object may include jitter, a first station receiver, a second station receiver, a first station sender, a second station sender, etc.

As an option, the tabular display 508 may further include a request/response field 516 which may list a plurality of requests and responses at the selected protocol layer. Also listed may be specific time periods and relative time periods associated with the requests and responses for providing an in-depth, detailed view of the specific voice application call communications.

The tree representation 501 may thus be displayed as a file directory, and the objects may be accessed and reported by selecting directories and files, etc. of the file directory. By this design, a plurality of nodes is provided each representing a flow associated with a particular protocol, wherein flow statistics are updated in real-time.

FIG. 6 illustrates a graphical user interface 600 similar to that of FIG. 5, with the exception of displaying lower protocol layer objects. As an option, the graphical user interface 600 may be displayed in response to the selection of one of the session objects shown in the tree representation 501 of FIG. 5.

As shown in FIG. 6, a tree representation 602 similar to that of FIG. 5 may be displayed. A tabular display 604 resulting from the selection of a session object in the representation 602 is also shown.

Such tabular display 604 includes a plurality of display portions each dedicated to displaying information associated with lower-layer objects associated with the object selected via the tree representation 602. In the present example, a session object is selected, thus a plurality of connection objects are displayed. Again, each connection object displayed in the display portions of the tabular display 604 includes a matrix having a plurality of x-axis parameters and y-axis parameters unique to the specific protocol corresponding to the connection object.

As an option, an application window 606 and an alarm window 608 may be included for displaying the associated application object and any alarms, respectively. For example, a user may be alerted upon one of the parameters of the matrix reaching a predetermined threshold.

By using the foregoing tree representation, a user may more efficiently and effectively navigate among the various voice application, session, and connection objects associated with a voice application call.

Figure 7:
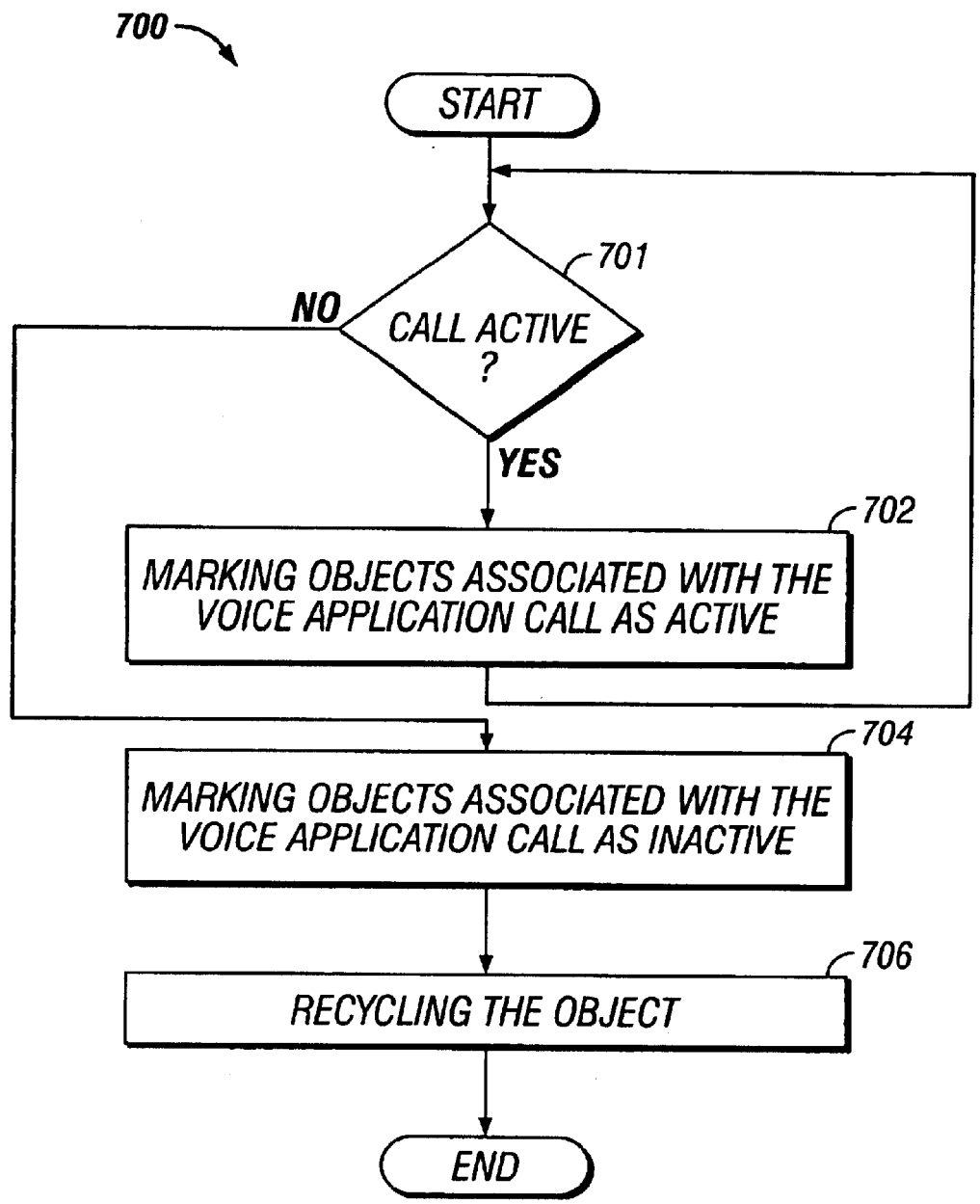
FIG. 7 illustrates an optional voice application call object recycling method that may be used in the context of the present invention.

FIG. 7 illustrates an optional voice application call object recycling method 700 that may be used in the context of the present invention. In use, it is initially determined in decision 701 as to whether a voice application call is active. This may be accomplished using an index variable that indicates whether the call is active. Of course, any desired viable technique may be used to determine whether the call is active.

Next, in operation 702, objects (i.e. application, session, connection objects) associated with the voice application call are marked as active. This may be done by simply tagging the objects, or utilizing any other desired technique. Thus, the recycling of the objects marked as active is prevented.

Once it is determined that the voice application call is inactive in decision 701, the objects associated with the voice application call are marked as inactive. Note operation 704. This, in turn, allows the recycling of such inactive objects in operation 706.

In the prior art, the recycling of a session object would result in the recycling of the associated application object, and possibly the unfortunate destruction of any other session objects associated with the application object. Since VoIP traffic has application objects with either 4 associated session objects (in the case of H.323 Application: H245, H225, RTP, and RTCP) or 3 associated session object (in the case of SIP Application: SIP SESSION, RTP, and RTCP), the prior art technique is very likely to allow the unwarranted destruction of data.

The present method corrects this deficiency by recycling only session objects that are associated with a complete call. In other words, the present method prevents active calls from being recycled. Furthermore, in order to prevent complete calls from being recycled unnecessarily, once a voice application call is recycled, its associated session and connection objects can be recycled. This lowers the number of un-recycled objects and decreases the chance of recycling a session object connected to a complete call that would be destroyed.

This further enhances the graphical user interfaces of FIGS. 5 and 6. In particular, it prevents the unnecessary loss of object information, until the voice application call has been ended.

Thus, in the interest of keeping as many complete calls available in the network analyzer, various conventions that may be employed for object recycling. See Table #1.

TABLE #1

1) All objects for active calls are marked as non-recyclable. Once such call is complete (no longer active) it is marked as recyclable at which time both the application and session objects may be recycled.
2) Once a VoIP object is recycled, the network analyzer moves up the tree representation until the application layer object is reached. Then, all of the lower layer objects down to and including the connection layer objects are recycled. This recycling implementation may be used for H.323, SIP, and SCCP experts.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for organizing objects associated with a voice application call in a tree representation, comprising:
   (a) identifying a voice application call;
   (b) generating a plurality of connection objects associated with the voice application call;
   (c) generating a plurality of session objects associated with the voice application call;
   (d) generating a plurality of application objects associated with the voice application call; and
   (e) organizing the connection objects, the session objects, and the application objects in a tree representation.

2. The method as recited in claim 1, wherein the voice application call is carried out utilizing a voice protocol.

3. The method as recited in claim 2, wherein the voice protocol is selected from the group consisting of H.323, H.248, session initiation protocol (SIP), and skinny client control protocol (SCCP).

4. The method as recited in claim 2, wherein voice protocol includes Voice over Internet Protocol (VoIP).

5. The method as recited in claim 1, wherein the application objects are selected from the group consisting of H.323 application objects, H.248 application objects, session initiation protocol (SIP) application objects, and skinny client control protocol (SCCP) application objects.

6. The method as recited in claim 1, wherein the session objects are selected from the group consisting of H.225.0 session objects, H.245 session objects, real-time transport protocol (RTP) session objects, and real-time transport control protocol (RTCP) session objects.

7. The method as recited in claim 1, wherein the connection objects are selected from the group consisting of transmission control protocol (TCP) connection objects, and user datagram protocol (UDP) connection objects.

8. The method as recited in claim 1, wherein the tree representation is displayed as a file directory including a plurality of directories and files.

9. The method as recited in claim 1, wherein the objects are accessed by selecting the directories and files.

10. The method as recited in claim 9, and further comprising reporting information relating to the objects upon the selection thereof.

11. A computer program product for organizing objects associated with a voice application call in a tree representation, comprising:

(a) computer code for identifying a-voice application call;

(b) computer code for generating a plurality of connection objects associated with the voice application call;

(c) computer code for generating a plurality of session objects associated with the voice application call;

(d) computer code for generating a plurality of application objects associated with the voice application call; and (e) computer code for organizing the connection objects, the session objects, and the application objects in a tree representation.

12. The computer program product as recited in claim 11, wherein the voice application call is carried out utilizing a voice protocol.

13. The computer program product as recited in claim 12, wherein the voice protocol is selected from the group consisting of H.323, H.248, session initiation protocol (SIP), and skinny client control protocol (SCCP).

14. The computer program product as recited in claim 12, wherein voice protocol includes Voice over Internet Protocol (VoIP).

15. The computer program product as recited in claim 11, wherein the application objects are selected from the group consisting of H.323 application objects, H.248 application objects, session initiation protocol (SIP) application objects, and skinny client control protocol (SCCP) application objects.

16. The computer program product as recited in claim 11, wherein the session objects are selected from the group consisting of H.225.0 session objects, H.245 session objects, real-time transport protocol (RTP) session objects, and real-time transport control protocol (RTCP) session objects.

17. The computer program product as recited in claim 11, wherein the connection objects are selected from the group consisting of transmission control protocol (TCP) connection objects, and user datagram protocol (UDP) connection objects.

18. The computer program product as recited in claim 11, wherein the tree representation is displayed as a file directory including a plurality of directories and files.

19. The computer program product as recited in claim 11, wherein the objects are accessed by selecting the directories and files.

20. The computer program product as recited in claim 19, and further comprising computer code for reporting information relating to the objects upon the selection thereof.

21. A system for organizing objects associated with a voice application call in a tree representation, comprising:

(a) logic for identifying a voice application call;

(b) logic for generating a plurality of connection objects associated with the voice application call;

(c) logic for generating a plurality of session objects associated with the voice application call;

(d) logic for generating a plurality of application objects associated with the voice application call; and (e) logic for organizing the connection objects, the session objects, and the application objects in a tree representation.

22. A method for organizing objects associated with a voice application call in a tree representation, comprising:

identifying a voice application call;

generating a plurality of objects associated with the voice application call; and organizing the objects in a tree representation for facilitating access to statistics associated therewith.

23. The method as recited in claim 22, wherein the objects include connection objects.

24. The method as recited in claim 22, wherein the objects include session objects.

25. The method as recited in claim 22, wherein the objects include application objects.

26. A computer program product for organizing objects associated with a voice application call in a tree representation, comprising:

computer code for identifying a voice application call;

computer code for generating a plurality of objects associated with the voice application call; and computer code for organizing the objects in a tree representation for facilitating access to statistics associated therewith.

27. The computer program product as recited in claim 26, wherein the objects include connection objects.

28. The computer program product as recited in claim 26, wherein the objects include session objects.

29. The computer program product as recited in claim 26, wherein the objects include application objects.

* * * * *